(12) United States Patent
Tamagnini

(10) Patent No.: US 10,959,507 B2
(45) Date of Patent: Mar. 30, 2021

(54) POWER GROUP

(71) Applicant: EMAK S.P.A., Bagnolo in Piano (IT)

(72) Inventor: Luca Tamagnini, Bagnolo in Piano (IT)

(73) Assignee: EMAK S.P.A., Bagnolo in Piano (IT)

( * ) Notice: Subject to any disclaimer, the term of this patent is extended or adjusted under 35 U.S.C. 154(b) by 0 days.

(21) Appl. No.: 16/343,084

(22) PCT Filed: Oct. 12, 2017

(86) PCT No.: PCT/IB2017/056324
§ 371 (c)(1),
(2) Date: Apr. 18, 2019

(87) PCT Pub. No.: WO2018/087613
PCT Pub. Date: May 17, 2018

(65) Prior Publication Data
US 2019/0328114 A1  Oct. 31, 2019

(30) Foreign Application Priority Data

Nov. 8, 2016 (IT) .......................... 102016000112089

(51) Int. Cl.
*A45F 3/10* (2006.01)
*A45F 3/08* (2006.01)
(Continued)

(52) U.S. Cl.
CPC ................ *A45F 3/08* (2013.01); *A01G 20/43* (2018.02); *A45F 3/047* (2013.01); *A45F 3/10* (2013.01); *A45F 2003/148* (2013.01)

(58) Field of Classification Search
CPC .... A45F 3/08; A45F 3/10; A45F 3/047; A45F 2003/148; A01G 20/43; A01G 20/47
(Continued)

(56) References Cited

U.S. PATENT DOCUMENTS

| 3,885,722 A | 5/1975 | Robertson |
| 5,450,995 A * | 9/1995 | Perrin .................... A45C 13/30 224/254 |

(Continued)

FOREIGN PATENT DOCUMENTS

| EP | 1577602 A2 | 9/2005 |
| EP | 2666909 A2 | 11/2013 |

(Continued)

*Primary Examiner* — Adam J Waggenspack
(74) *Attorney, Agent, or Firm* — Volpe Koenig

(57) ABSTRACT

A power group includes: an engine, and a shoulder support for the engine. The shoulder support includes: a support frame adapted for supporting the engine, the support frame having an L-shape and a vertical first portion and an horizontal second portion cantilevered associated with the first portion and to which the engine is connected at the top of the horizontal second portion to be supported thereon; a wearable framework connected to the support frame, and a damper element interposed between the support frame and at least one element of which the wearable framework is made up. A first element, of which the wearable framework is made up, includes a lumbar support and the damper element includes a first damper interposed between the lumbar support and the support frame.

6 Claims, 4 Drawing Sheets

(51) Int. Cl.
    *A01G 20/43* (2018.01)
    *A45F 3/04* (2006.01)
    *A45F 3/14* (2006.01)

(58) Field of Classification Search
    USPC .................................................. 224/262
    See application file for complete search history.

(56) References Cited

U.S. PATENT DOCUMENTS

| | | | | |
|---|---|---|---|---|
| 5,829,874 A | * | 11/1998 | Breeding | B01F 11/04 |
| | | | | 366/120 |
| 5,954,250 A | * | 9/1999 | Hall | A62B 9/04 |
| | | | | 224/262 |
| 6,511,286 B2 | * | 1/2003 | Miyamoto | F04D 29/667 |
| | | | | 415/191 |
| 6,857,163 B2 | * | 2/2005 | Iida | A47L 5/14 |
| | | | | 15/327.5 |
| 8,032,980 B2 | * | 10/2011 | Basenberg, Jr. | A01M 7/0021 |
| | | | | 15/327.5 |
| 9,220,333 B2 | * | 12/2015 | Losos | A45F 3/10 |
| 9,888,761 B2 | * | 2/2018 | Kao | A45F 3/047 |
| 2006/0163305 A1 | * | 7/2006 | Tong | A45F 3/08 |
| | | | | 224/628 |
| 2007/0075105 A1 | * | 4/2007 | Petrin | A45F 4/02 |
| | | | | 224/153 |
| 2008/0035686 A1 | * | 2/2008 | Gregory | A45F 3/10 |
| | | | | 224/262 |
| 2015/0113758 A1 | | 4/2015 | Nashimoto et al. | |
| 2015/0189974 A1 | * | 7/2015 | Bercaw | A45F 3/04 |
| | | | | 224/633 |
| 2015/0282435 A1 | | 10/2015 | Mutoh et al. | |
| 2016/0000212 A1 | * | 1/2016 | Lee | A45F 3/10 |
| | | | | 224/265 |

FOREIGN PATENT DOCUMENTS

| | | | |
|---|---|---|---|
| FR | 2183963 A1 | 12/1973 | |
| JP | 11009052 A * | 1/1999 | ............ A45F 3/10 |
| WO | 2013104338 A1 | 7/2013 | |

* cited by examiner

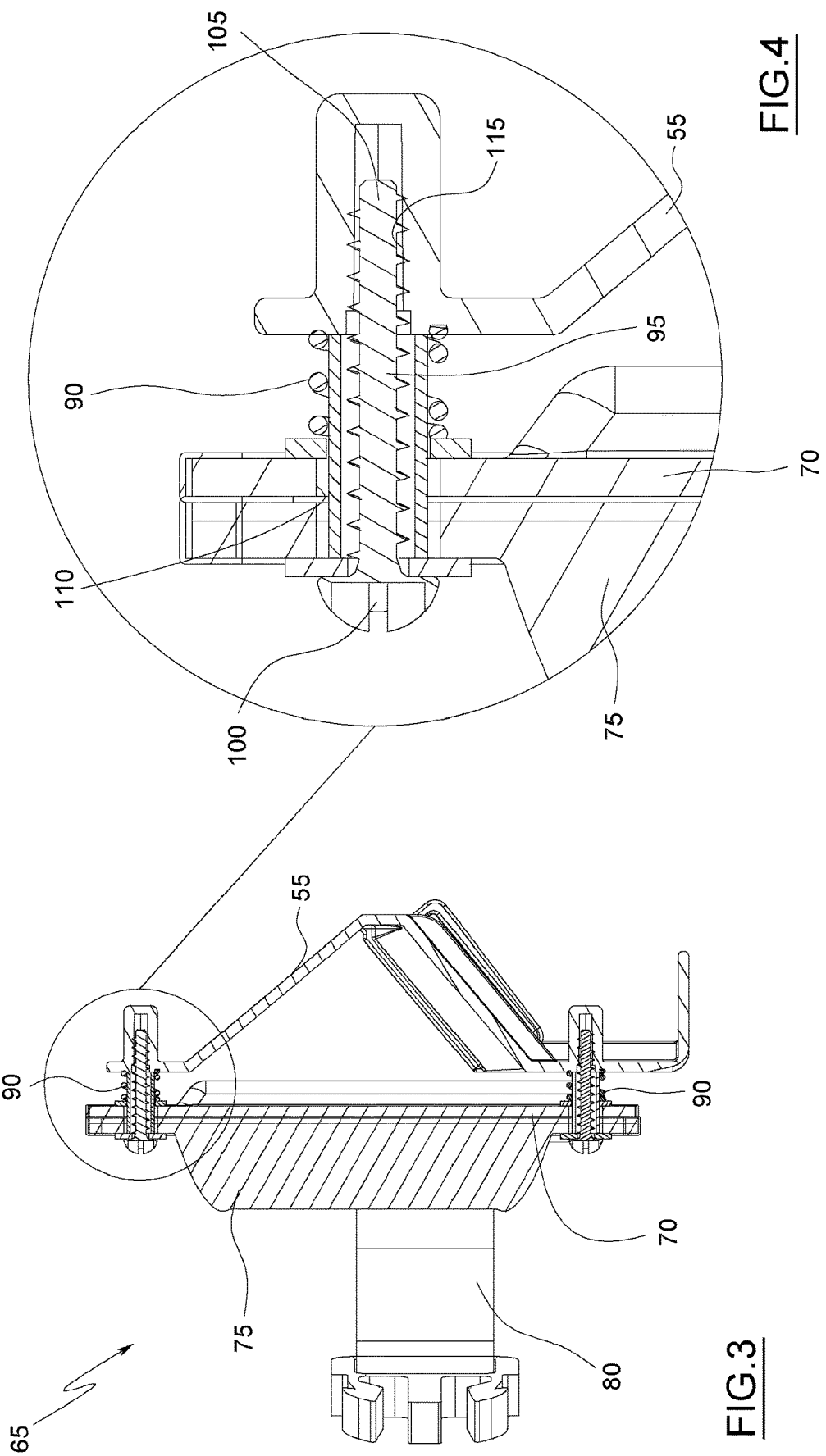

POWER GROUP

TECHNICAL FIELD

The present invention refers to a power group comprising a shoulder support and an engine.

More specifically, the present invention refers to a backpack structure for supporting an engine generally of the endothermal type on the shoulders, said engine actuating a tool like, for example, a strimmer, hedge trimmer, pruner, blower/aspirator, atomizer and the like for gardening operations, through a flexible duct.

PRIOR ART

Motorised devices for tending to greenery, for example in difficult-to-reach places, are known, which comprise: an endothermal engine for actuating a tool, a support frame adapted for supporting the engine and a framework wearable by the user and associated with the support frame.

The wearable framework foresees a back-plate, to which wearable shoulder straps are fixed and, on the opposite side to the shoulder straps, supports the support frame, for example through a hooking mechanism. The back-plate is also fixed to a lumbar support that, making contact with the lumbar area of the user, improves the usage comfort of the device.

As can be worked out, the vibrations generated by the engine or the imbalances due to the movement of the engine itself under its weight are discharged, through the support frame and the wearable framework, on the user who can undergo the recoil thereof.

A great need, therefore, in this type of shoulder supports is that of limiting the stresses on the user as much as possible.

A purpose of the present invention is to provide a shoulder support for an engine capable of satisfying such a need of the prior art, in the context of a simple and rational constructive solution.

Such purposes are accomplished by the characteristics of the invention given in the independent claim. The dependent claims outline preferred and/or particularly advantageous aspects of the invention.

SUMMARY OF THE INVENTION

The invention provides a power group comprising an engine and a shoulder support for the engine, wherein said shoulder support comprises: a support frame adapted for supporting the engine, a wearable framework connected to the support frame, and a damper element arranged (indirectly) between the support frame and at least one element of which the wearable framework consists.

Thanks to such a solution, the transmission of vibrations and recoils from the engine to the user is substantially reduced.

According to an aspect of the invention, a first element of which the wearable framework consists can comprise (or can be constituted of) a lumbar support. In that way it facilitates a correct posture of the spine of the user during the use of the power group.

According to another aspect of the inventions, the damper element can comprise a first damper arranged (indirectly) between the lumbar support and the support frame.

In this way, the vibrations transmitted to the torso of the user are reduced. According to a further aspect of the invention, a second element of which the wearable framework consists can comprise (or can be constituted of) a shoulder strap.

Thanks to this solution the weight of the power group mainly burdens the shoulders of the user, contributing comfort during the use of the power group.

According to another aspect of the invention the damper element can comprise a second damper, which is arranged (indirectly) between said shoulder strap and the support frame.

In this way, fatigue due to the vibrations that are transmitted from the engine to the shoulders of the user through the shoulder straps can be decreased. According to another aspect of the invention, a third element of which the wearable framework consists can comprise (or can be constituted of) a back-plate removably connected to the support frame, for example through engagement/disengagement means.

Thanks to such a solution, the wearable framework is separable, for example in the case of need or emergency, from the support frame of the engine. Advantageously, the back-plate can be connected to the support frame in a movable manner with at least one degree of freedom and the damper element comprises a third damper arranged (indirectly) between the back-plate and the support frame.

In this way, localised fatigue due to the vibrations that the engine transmits to the engine user is further reduced.

According to a further possible aspect of the invention, the wearable frame-work can comprise an inextensible flexible member and the second damper is arranged between said flexible member and the shoulder strap.

Preferably, the first damper can be arranged (directly) between the lumbar support and the back-plate.

Advantageously, the second damper can be arranged (directly) between the shoulder strap and the back-plate.

BRIEF DESCRIPTION OF THE DRAWINGS

Further characteristics and advantages of the invention will become clearer from reading the following description provided as a non-limiting example, with the help of the figures illustrated in the attached tables.

FIG. 3 is a section view of FIG. 2 according to the plane III-III.

FIG. 4 is an enlargement of a portion of FIG. 3.

DETAILED DESCRIPTION

Figure 1:
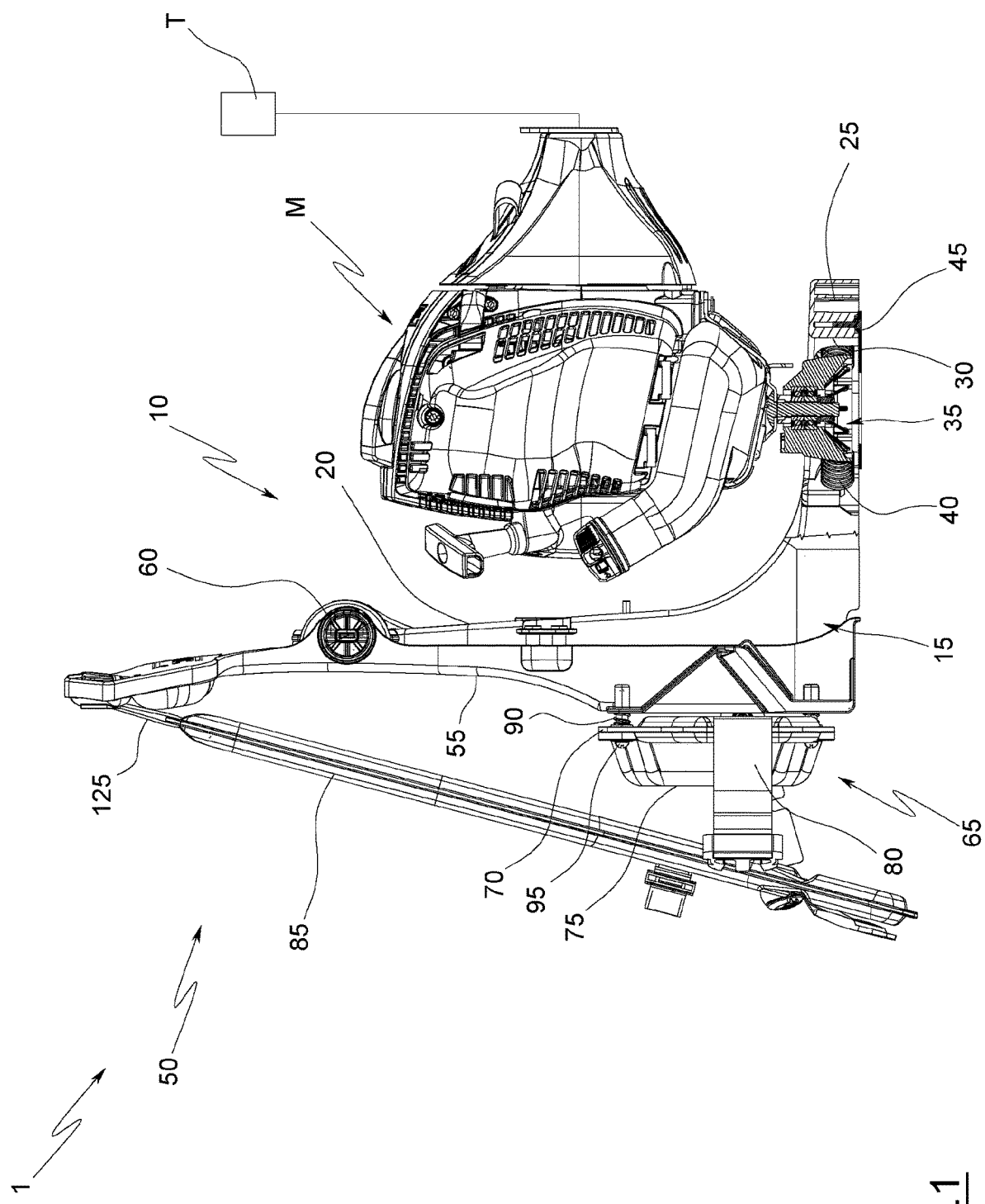
FIG. 1 is a side view with a portion in section of a power group according to the invention equipped with an engine.
Figure 2:
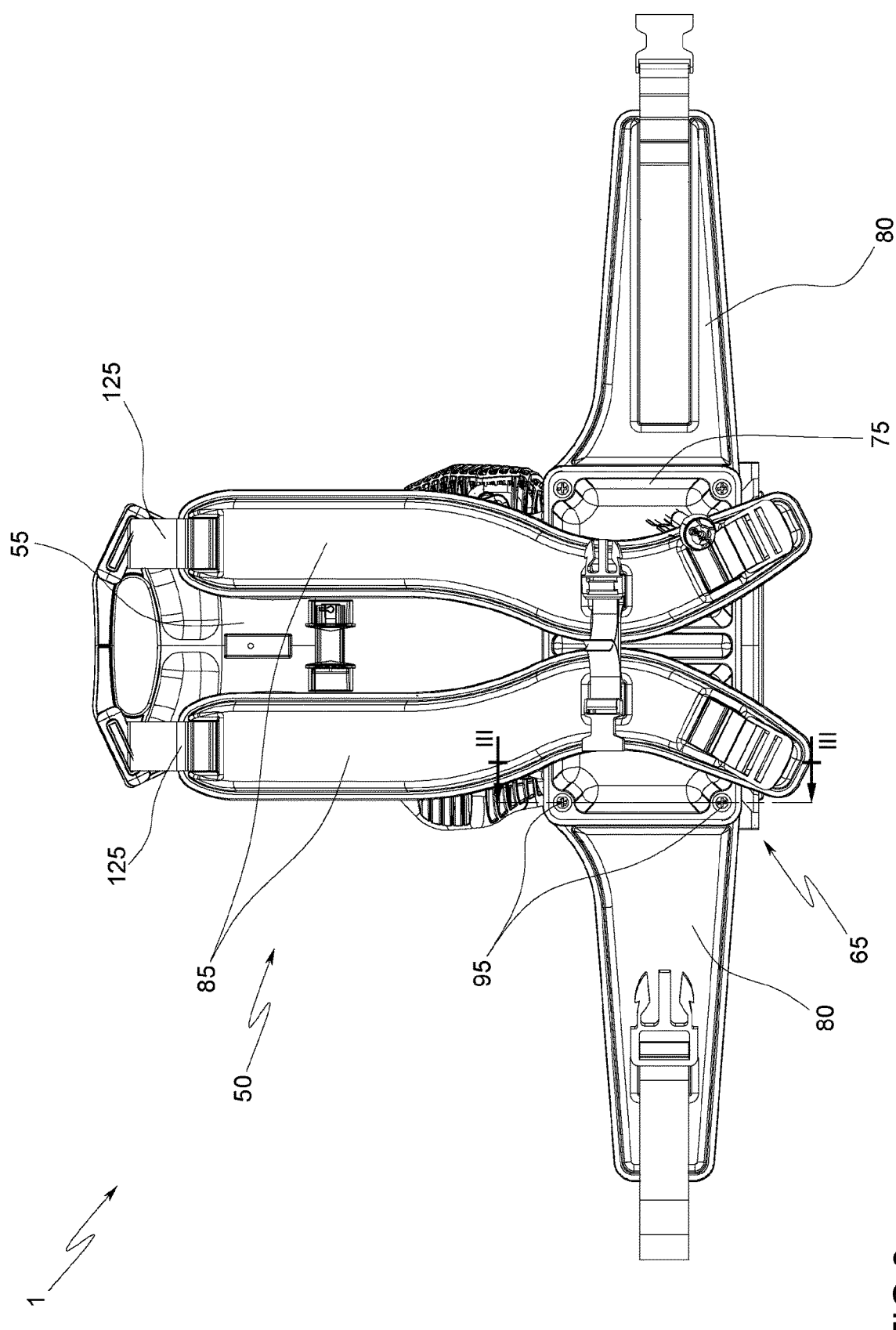
FIG. 2 is a front view of the power group of FIG. 1.
Figure 5:
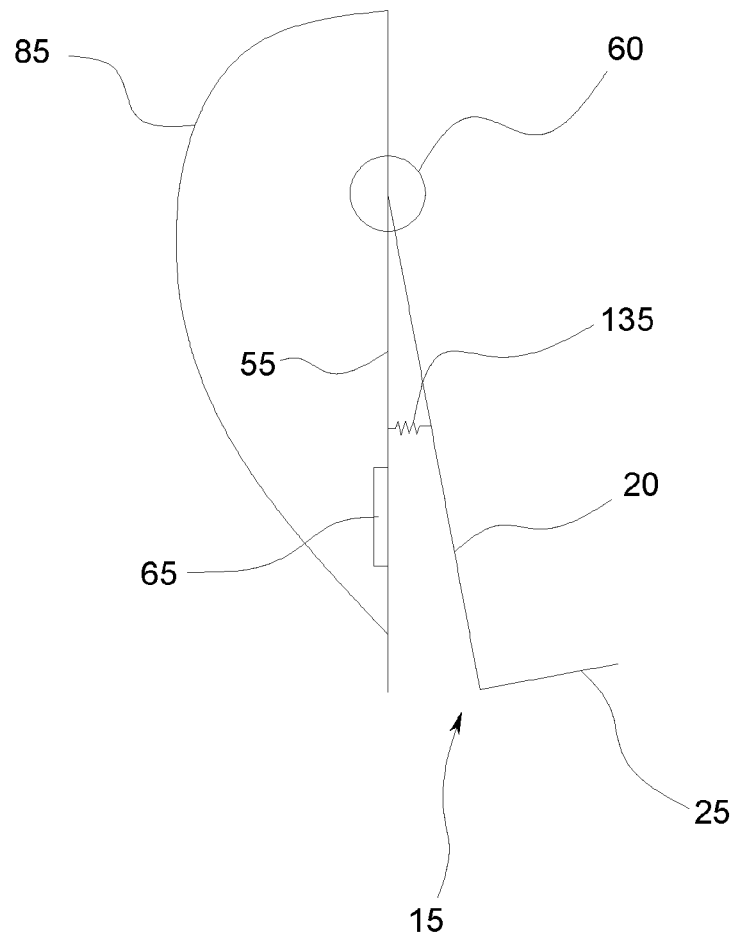
FIG. 5 is a schematic view of another embodiment of the shoulder support.

With particular reference to FIGS. 1 and 2, a power group, comprising a shoulder support 10 and an engine M adapted for actuating a gardening tool T, for example a strimmer, is globally indicated with 1.

The shoulder support 10 comprises a substantially L-shaped support frame 15 adapted for supporting the engine M.

The support frame 15 has a first portion 20 and a second portion 25 associated canti-levered with the first portion and to which the engine M is connected at the top.

For example, the connection of the engine M to the second portion 25 of the support frame 15 is totally analogous or identical to that shown and described in the copending patent application to the same Applicant, which should be deemed to be entirely incorporated here for reference.

In particular, in use, the first portion 20 is adapted for being arranged substantially vertically, whereas the second portion 25 is adapted for being arranged substantially horizontally.

In the illustrated example the support frame 15 can be made in a single body, for example by moulding.

The second portion 25 of the support frame 15 comprises a through opening defining a housing seat 30 for a connection body 35 adapted for connecting the engine M to the support frame 15.

Between the connection body 35 and the housing seat 30 a plurality of springs 40 are arranged radially with respect to the connection body.

The support frame 15 comprises at least one abutment element 45 connected to one from the connection body 35 and the support frame 15 and configured to limit the oscillation of the connection body 35 with respect to the support frame 15.

Moreover, the shoulder support 10 also comprises a wearable framework 50 adapted for being worn by the user of the gardening tool.

The wearable framework 50 comprises a back-plate 55 to which the support frame 15 is fixed in a releasable manner.

For example, the back-plate 55 is connected to the first portion 20 of the support frame 15 through engagement/disengagement means 60, which comprise a first portion rigidly connected to the support frame 15 and a second portion rigidly connected to the back-plate 55.

The engagement/disengagement means 60 can for example be of the type described in European Patent EP 1 577 602 B1 to the same Applicant and referred to here in its entirety for reference.

The wearable framework 50 comprises a lumbar support 65 connected to the back-plate 55 on the opposite side with respect to the support frame 15, for example close to an area of the back-plate 55 facing a lumbar area of the user, during use.

Such an area of the back-plate 55 has a recess adapted for at least partially housing the lumbar support 65.

The lumbar support 65 comprises a plate 70 through which the lumbar support 65 is fixed to the back-plate 55, and a cushion 75 fixed to the plate 70 on the opposite side with respect to the back-plate 55.

This does not rule out the possibility of the plate 70 and the cushion 75 being made in a single body.

The shoulder support 10 can for example comprise a lumbar band 80 associated with the lumbar support 65 and adapted for wrapping around the user in the torso area to keep the lumbar support 65 in contact with the lumbar area of the user.

The lumbar band 80 can for example comprise a pair of bands, fixed to opposite ends of the lumbar support 65, and a hooking mechanism adapted for connecting the free ends of the bands, forming a closed loop around the torso of the operator.

The shoulder support 10 also comprises a shoulder strap 85, which is fixed to the back-plate 55 so as to define, with said back-plate 55, a closed loop adapted for wrapping around the operator in the area of the torso and the shoulders.

The shoulder strap has a first end connected to an end of the back-plate 55 distal from the second portion 25 of the support frame 15 and a second end connected to an end of the back-plate 55 proximal to the second portion 25. For example, the shoulder support 10 comprises a pair of symmetrical shoulder straps 85 with respect to a mid-plane passing through a longitudinal axis of the back-plate 55.

The shoulder support 10 comprises a damper element arranged between the support frame 15 and at least one element of which the wearable framework 50 consists.

In a preferred embodiment illustrated in the drawings, the damper element comprises a first damper 90 arranged between the lumbar support 65 and the support frame 15.

In particular, the first damper 90 is arranged between the back-plate 55 and the plate 70 of the lumbar support 65.

The first damper 90 can for example comprise a spring, for example a helical (compression) spring.

Preferably, the first damper 90 can for example comprise a plurality of springs (for example suitably distributed over the surface of the plate 70).

The first damper 90 comprises for example a first end associated (and in contact), for example through the interposition of a washer, with a rear surface of the plate 70, i.e. the surface of the plate 70 facing towards the back-plate 55 (and/or the support frame 15).

The first damper 90 also comprises a second end associated (and in contact) with a front surface of the back-plate 55, i.e. the surface of the back-plate 55 facing towards the plate 70 (and/or the user).

The first damper 90 could alternatively or in addition comprise at least one damper body, for example made of an elastomeric material (for example made of rubber).

In this embodiment, the lumbar support 65, i.e. the plate 70, is connected to the back-plate 55 with a (single) degree of freedom (translational, for example with respect to a translation direction perpendicular to a plane of the back-plate 55).

For example, between the lumbar support 65, i.e. the plate 70, and the back-plate 55 a prismatic connection is arranged with sliding axis perpendicular to a plane of the back-plate 55.

In the preferred embodiment, such a prismatic connection comprises a rod 95 adapted for connecting the plate 70 to the back-plate 55 keeping the first damper 90 arranged in contact between said plate 70 and said back-plate 55. The rod 95 has a first end 100 associated with the plate 70 and a second end 105 associated with the back-plate 55.

The rod 95 can be inserted in a hole 110 formed in the plate 70 and in a corresponding hole 115 formed in the back-plate 55.

The holes 110, 115 have axes substantially perpendicular to the plane of the back-plate 55.

The hole 110 formed in the plate 70 can for example be of the through-type. The hole 115 formed in the back-plate 55 can for example be of the blind and threaded type.

The first end 100 of the rod 95 is shaped like an enlarged head having greater radial bulk than the hole 110 formed in the plate 70 (and/or than the hole of a washer arranged between the first end 100 and the plate 70) and adapted for abutting on a surface of the plate itself opposite the back-plate 55.

The second end 105 of the rod 95 is threaded and screwed into the hole 115 formed in the back-plate 55.

However, this does not rule out the possibility that the hole 115 formed in the back-plate 55 may be of the through type and that the second end 105 of the rod 95 protrudes with respect to the hole 115, on the opposite side of said back-plate 55 with respect to the lumbar support 65, and that said second end 105 is locked through a threaded connection, for example a bolt, to slide axially in the direction of the plate 70.

For example, the prismatic connection can be defined by a plurality (in the figure there are 4) of rods 95 each connected as described above. In the illustrated example, one or each first damper 90 (helical spring) is slotted onto one or each rod 95.

The first damper 90 is adapted for limiting the oscillations due to the connection between the lumbar support 65 and the back-plate 55 (with respect to the aforementioned single degree of freedom of the prismatic connection).

In practice, the lumbar support 65 coming closer to the back-plate 55 is adapted for compressing the first damper 90 (i.e. the helical spring) in contrast to the elastic thrust thereof.

The prismatic connection can for example comprise a cylindrical jacket slotted (with clearance) onto the rod 95 and arranged (with clearance) between said rod and the first damper 90.

The cylindrical jacket is at least partially inserted in the hole 110 formed in the plate 70 and has an end arranged in abutment on the first end 100 of the rod 95 (and/or on the washer arranged between the first end 100 and the plate 70) and an opposite end arranged in abutment on the back-plate 55.

Alternatively or in addition, the damper element comprises a second damper 125 arranged between each shoulder strap 85 and the support frame 15. Specifically, the second damper 125 is arranged between each shoulder strap 85 and the back-plate 55, for example between each shoulder strap 85 and the end of the back-plate 55 distal from the second portion 25 of the support frame 15 to which the upper end of the shoulder strap itself is fixed.

The second damper 125, for example, can be a separate body from the shoulder strap 85, for example that interconnects the shoulder strap itself to the back-plate 55.

In this case, the second damper 125 can be defined by (consist of or comprise) a spring or an elastically deformable body under traction (elastomer).

Alternatively or in addition, the second damper 125, for example, can be in a single body with the shoulder strap 85, i.e. the entire shoulder strap 85 or only an axial (end or intermediate) segment thereof can be made of an elastically deformable body, for example under traction.

Alternatively or in addition to what is described above, the back-plate 55 could be connected to the support frame 15 in a movable manner with a (single) degree of freedom, as shown schematically in FIG. 4, for example rotational with respect to an axis of oscillation parallel to the plane of the back-plate 55 and substantially horizontal (i.e. parallel to the intersection line between the two portions of the support frame 15).

In this case, the damper element can comprise a third damper 135 arranged between the back-plate 55 and the support frame 15, for example to limit/dampen the stresses of the support frame 15 with respect to the back-plate 55.

The third damper 135 can for example be a spring, for example helical or torsion spring, or a body made of elastomeric material or a combination thereof. The operation of the shoulder support 10 according to the invention is as follows.

When the tool T connected to the engine is actuated, said engine generates vibrations and imbalances (due to its own weight) that through the connection body 35 reach the bearing frame 15.

From the bearing frame 15 in order to reach the user they must cross at least one from the first damper 90, the second damper 125 and the third damper 135, which take care of reducing the magnitude of said imbalances and vibrations that propagate in the back-plate 55, in the shoulder straps 85 and in the lumbar support 65.

The invention thus conceived can undergo numerous modifications and variants, all of which are covered by the inventive concept.

Moreover, all of the details can be replaced by other technically equivalent elements.

In practice, the materials used, as well as the contingent shapes and sizes, can be whatever according to requirements without for this reason departing from the scope of protection of the following claims.

The invention claimed is:

1. A power group comprising:
an engine, and
a shoulder support for the engine,
wherein said shoulder support comprises:
a support frame adapted for supporting the engine, wherein the support frame is L-shaped and has a vertical first portion and an horizontal second portion cantilevered associated with the first portion wherein the engine is connected at the top of the horizontal second portion to be supported thereon,
a wearable framework connected to the support frame, wherein the wearable framework is configured to contact a user human body when the wearable framework is worn by a user and wherein the wearable framework comprises a back-plate detachably connected to the support frame, a lumbar support connected to the back-plate on the opposite side with respect to the support frame and a shoulder strap connected to the back-plate; and
a damper group configured to absorb vibrations generated by the engine and transmitted from the support frame to the wearable framework, wherein the lumbar support is connected to the back-plate with a single translational degree of freedom,
wherein the damper group comprises a first damper configured to absorb vibrations generated by the engine and transmitted from the support frame to the lumbar support, wherein the first damper is arranged directly between the back-plate and the lumbar support and
wherein the first damper is configured to limit the oscillations between the lumbar support and the back-plate with respect to said translational degree of freedom.

2. The power group according to claim 1, wherein the damper group further comprises a second damper configured to absorb vibrations generated by the engine and transmitted from the support frame to the shoulder strap, wherein the second damper is interposed between at least a portion of the shoulder strap and the back plate.

3. The power group according to claim 1, wherein the back-plate is connected to the support frame in a movable manner with at least one degree of freedom and the damper group further comprises a third damper configured to absorb vibrations generated by the engine and transmitted from the support frame to the back-plate, wherein the third damper is directly interposed between the back-plate and the support frame.

4. The power group according to claim 1, wherein the back-plate is connected to the support frame through an engagement and disengagement mechanism.

5. The power group according to claim 3, wherein the back-plate is rotatably connected to the support frame.

6. A power group comprising:
an engine; and
a shoulder support for the engine, wherein said shoulder support comprises:

a support frame adapted for supporting the engine, wherein the support frame is L-shaped and has a vertical first portion and an horizontal second portion cantilevered associated with the first portion, wherein the engine is connected at the top of the horizontal second portion to be supported thereon;

a wearable framework connected to the support frame, wherein the wearable framework is configured to contact a user human body when the wearable framework is worn by a user and wherein the wearable framework comprises a back-plate detachably connected to the support frame, a lumbar support connected to the back-plate on the opposite side with respect to the support frame and a shoulder strap connected to the back-plate; and a damper group configured to absorb vibrations generated by the engine and transmitted from the support frame to the wearable framework, wherein the back-plate is connected to the support frame in a movable manner with at least one degree of freedom and wherein the damper group comprises a third damper configured to absorb vibrations generated by the engine and transmitted from the support frame to the back-plate, and wherein the third damper is directly interposed between the back-plate and the support frame wherein the lumbar support is connected to the back-plate with a single translational degree of freedom, and wherein the damper group further comprises a first damper configured to limit oscillations between the lumbar support and the back-plate with respect to said translational degree of freedom.

* * * * *